United States Patent [19]
Wilson

[11] Patent Number: 5,838,892
[45] Date of Patent: Nov. 17, 1998

[54] METHOD AND APPARATUS FOR CALCULATING AN ERROR DETECTING CODE BLOCK IN A DISK DRIVE CONTROLLER

[75] Inventor: Carrel Wilson, Villa Park, Calif.

[73] Assignee: EMC Corporation, Hopkinton, Mass.

[21] Appl. No.: 581,698

[22] Filed: Dec. 29, 1995

[51] Int. Cl.[6] .................................................. G06F 11/34
[52] U.S. Cl. ...................... 395/182.04; 371/48; 371/49.2
[58] Field of Search ...................... 395/182.04; 371/49.1, 371/37.01, 48, 49.2

[56] References Cited

U.S. PATENT DOCUMENTS

| | | | |
|---|---|---|---|
| 4,761,785 | 8/1988 | Clark et al. ................................. | 371/51 |
| 4,942,579 | 7/1990 | Goodlander et al. ...................... | 371/51 |
| 4,949,303 | 8/1990 | Hoshino et al. .......................... | 364/900 |
| 5,206,943 | 4/1993 | Callison et al. .......................... | 395/425 |
| 5,233,618 | 8/1993 | Glider et al. ............................. | 371/68.1 |
| 5,257,391 | 10/1993 | Dulac et al. .............................. | 395/800 |
| 5,274,799 | 12/1993 | Brant et al. .......................... | 395/182.04 |
| 5,283,791 | 2/1994 | Halford ................................... | 371/40.4 |
| 5,313,585 | 5/1994 | Jeffries et al. ........................... | 395/275 |
| 5,341,381 | 8/1994 | Fuller ..................................... | 371/10.1 |
| 5,398,253 | 3/1995 | Gordon ................................... | 371/40.4 |
| 5,418,925 | 5/1995 | Demoss et al. ......................... | 395/425 |
| 5,440,716 | 8/1995 | Shultz et al. ............................ | 395/441 |

*Primary Examiner*—Phung M. Chung
*Attorney, Agent, or Firm*—David N. Caracappa

[57] ABSTRACT

A disk drive controller includes a memory for storing a plurality of blocks each having a predetermined size, and a parity engine. The parity engine includes a data buffer RAM for storing a block having the predetermined size. A function circuit has a first input terminal coupled to the disk drive controller memory, a second input terminal coupled to the output of the data buffer RAM, and an output terminal coupled to the input of the data buffer RAM. A command circuit, conditions the function circuit and the data buffer RAM to operate in a first operating mode to retrieve a block from the disk drive controller memory and store it in the data buffer RAM, and in a second operating mode to calculate the exclusive-OR (XOR) of a block from the disk drive controller memory with a block from the data buffer RAM and store the result in the data buffer RAM.

13 Claims, 3 Drawing Sheets

METHOD AND APPARATUS FOR CALCULATING AN ERROR DETECTING CODE BLOCK IN A DISK DRIVE CONTROLLER

The present invention relates to a disk drive controller for use in a computer system, and in particular to an improved method and apparatus for calculating error detecting code information for blocks of data written to or read from the disk drives in such a disk drive controller.

BACKGROUND OF THE INVENTION

Current disk drive controllers for computer systems store data on the disk drives in a reliable manner by storing not only the data, but also error detecting and correcting codes. In this manner, if an error is made in the retrieval of the data from the disk drives, that error can be detected and corrected. One known arrangement for storing and retrieving data reliably is known by the term RAID (redundant array of inexpensive disks). One implementation of a RAID system is termed a RAID 5 system. In a RAID 5 system, a number of disk drives store the data and error detecting and correction codes. The data is partitioned into a predetermined number of blocks, each having a predetermined size. A block containing an error detecting code is then calculated from these data blocks. The data blocks and the error detecting code block are then stored at appropriate locations on appropriate ones of the disk drives.

In known RAID 5 systems, a disk drive controller is coupled between the host computer system (which includes one or more processors) and the disk drives. For write operations, the disk drive controller receives data from the host computer system to be stored on the disk drives; partitions the data into data blocks; calculates the error detecting code block(s); then stores the data and error detecting code block(s) in the appropriate locations on the appropriate disk drives. For read operations, the disk drive controller retrieves the desired data blocks from the appropriate locations on the appropriate disk drives. If any of the internal error detection mechanisms which are a part of the disk drives indicate that an error has occurred, or if a disk drive is out of service, then the error detecting code block(s) associated with the data blocks to be retrieved are retrieved from the appropriate locations on the appropriate disk drives. The disk drive controller then detects and corrects any errors in the retrieved data; and then returns the desired data to the computer system.

The disk drive controller in known RAID 5 systems includes a processor, termed a local processor, which has associated with it a read only memory (ROM) containing fixed programs and data for execution by the processor, a read/write memory (RAM), which is generally implemented by a dynamic RAM (DRAM), for storing temporary variables, program execution data, and the data and error correcting code blocks being transferred through the disk drive controller, a mass storage device, such as a diskette drive for storage of larger programs and data for use by the local processor, and various input/output devices for communication between the disk drive controller and the maintenance engineer.

In such RAID 5 systems, the error detection code is a parity code calculated over a block of data in such a manner that not only can an error be detected, but its location determined so that it can be corrected. In some prior RAID 5 systems, the local processor accesses the data and error detecting code blocks being stored into or retrieved from the RAM, and calculates a corresponding parity word as each word of data is traversing through the disk drive controller, a process known as on-the-fly parity calculation. This method of calculating parity blocks involves the local processor, which significantly reduces the throughput available to the disk drive controller.

U.S. Pat. No. 5,418,925, FAST WRITE I/O HANDLING IN A DISK ARRAY USING SPARE DRIVE FOR BUFFERING, issued May 23, 1995 to DeMoss et al., illustrates a system in which separate hardware is used to calculate a parity block on-the-fly, as the data is passing through the disk drive controller. This method still has decreased throughput through the disk drive controller because of the on-the-fly aspect of the parity calculation.

In U.S. Pat. No. 5,206,943, DISK ARRAY CONTROLLER WITH PARITY CAPABILITIES, issued Apr. 27, 1993 to Callison et al., blocks of data are cached in the disk drive controller RAM. Two data blocks at a time are read from the cache, one 16-bit word at a time, using known direct memory access (DMA) techniques: a first DMA cycle obtains a first 16 bit data word, and a second DMA cycle obtains a second 16 bit data word. A parity block is calculated, one word at a time by the DMA controller, which has been slightly modified to include an XOR function circuit which can perform that operation as the data is passing through the DMA controller. As each parity block word is calculated, it is written via a third DMA cycle to overwrite the corresponding location in the second data block. The newly calculated parity block, thus, replaces the second of the two data blocks. When the parity block has been completely calculated, it is written into the appropriate location on the disk drives (for a write operation), or checked to detect errors (during a read operation). While this method is more efficient than directly involving the local processor in the parity block calculation, it is inflexible in its treatment of the locations within the disk drive controller RAM of the blocks used to store the newly calculated parity blocks, since the parity block always overwrites the second data block. In addition, it is inefficient in its access to the disk drive controller RAM because data is read in only 16-bit groups, and three DMA cycles are required for each 16-bit word.

A RAID disk drive controller is desirable which will permit parity error detecting blocks to be calculated without requiring the use of the local processor, which permits flexibility in locating the data blocks and the resulting parity error detecting block in the disk drive controller RAM, and which is more efficient in accessing that RAM.

SUMMARY OF THE INVENTION

In accordance with principles of the present invention, a disk drive controller includes a memory for storing a plurality of blocks each having a predetermined size, and a parity engine. The parity engine includes: a data buffer RAM for storing a block having the predetermined size; a function circuit, having a first input terminal coupled to the disk drive controller memory, a second input terminal coupled to the output of the data buffer RAM, and an output terminal coupled to the input of the data buffer RAM; and a command circuit, for conditioning the function circuit and the data buffer RAM to operate in a first operating mode to retrieve a block from the disk drive controller memory and store it in the data buffer RAM, and in a second operating mode to calculate the exclusive-OR (XOR) of a block from the disk drive controller memory with a block from the data buffer RAM and store the result in the data buffer RAM.

Also in accordance with principles of the present invention, a method for calculating an error detecting code block in the disk drive controller memory in such a disk drive controller is also disclosed and includes the following steps. First, a block is transferred from the disk drive controller memory to the data buffer RAM. Second, the exclusive-OR of one or more other blocks from the disk drive controller memory with the block in the data buffer RAM is calculated. Then, the resulting block in the data buffer RAM is transferred back to a block in the disk drive controller RAM.

DETAILED DESCRIPTION OF THE DRAWINGS

Figure 1:
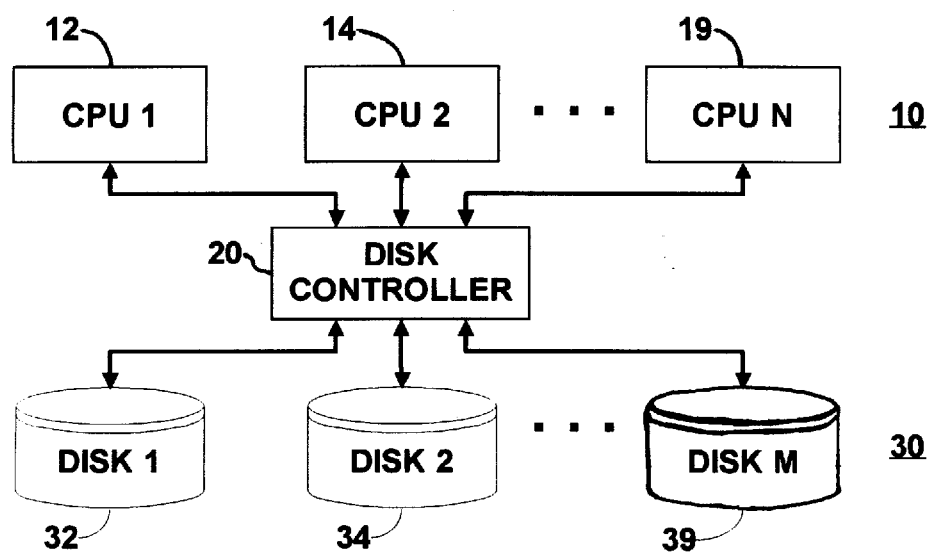
FIG. 1 is a block diagram of a computer system including a disk drive subsystem in accordance with principles of the present invention.

FIG. 1 is a block diagram of a computer system including a disk drive subsystem according to the present invention. In FIG. 1, a plurality of N central processing units (CPUs) 10 are a plurality of M disk drive units 30 through a disk drive controller 20. Each of the respective CPUs 10: CPU 1 12, CPU 2 14 and CPU N 19 are coupled to the disk drive controller 20 through a corresponding bi-directional channel. In the illustrated embodiment, for example, each of the CPUs 12, 14 and 19 are coupled to the disk drive controller 20 via known SCSI bus channels. Each of the respective disk drives 30: DISK 1 32, DISK 2 34 and DISK M 39 are also coupled to the disk drive controller 20 through corresponding bi-directional channels. In the illustrated embodiment, for example, each of the disk drives 32, 34 and 39 are also coupled to the disk drive controller 20 via known SCSI bus channels.

In operation, the disk drive controller 20 operates to provide RAID 5 storage to the plurality of CPUs 10, utilizing the plurality of disk drives 30 as its disk drive array. In a write operation, one of the plurality of CPUs sends a write request accompanied by data to be written to a specified location on the disk drives to the disk drive controller 20 via its SCSI bus channel. The disk drive controller 20 partitions the write data from the CPU into appropriate sized blocks. The disk drive controller 20 then calculates appropriate error detecting code blocks corresponding to the partitioned data blocks, in a manner known in RAID 5 disk drive systems. When the error detecting code blocks have been calculated, the disk drive controller 20 stores the data blocks and the corresponding error detecting code blocks into the appropriate locations on appropriate disk drives among the plurality of disk drives 30 via the appropriate SCSI bus channels.

In a read operation, one of the CPUs 10 sends a read request to the disk drive controller 20 via its SCSI bus channel specifying the location on the disk drives 30 containing the desired data. The disk drive controller 20 retrieves the data blocks containing the desired data via the SCSI bus channels. During the retrieval process, the internal electronics of the disk drives 30 monitor the data transfers for errors. If no errors are detected, then the requested data is returned to the CPU via its SCSI bus channel. If an error is detected, then the disk drive controller 20 is notified and the associated error detecting code blocks are also retrieved from the appropriate locations on the appropriate disk drives via the SCSI bus channels. The disk drive controller 20 then analyzes the retrieved data blocks and the associated error detecting code blocks to detect and correct any errors which occurred in the retrieval process, in a manner known in RAID 5 disk drive systems. When the detected errors are corrected, the data requested by the CPU is returned to that CPU via its SCSI bus channel. If the detected errors were uncorrectable, then the disk drive controller 20 informs the CPU so that recovery operations may be performed.

Figure 2:
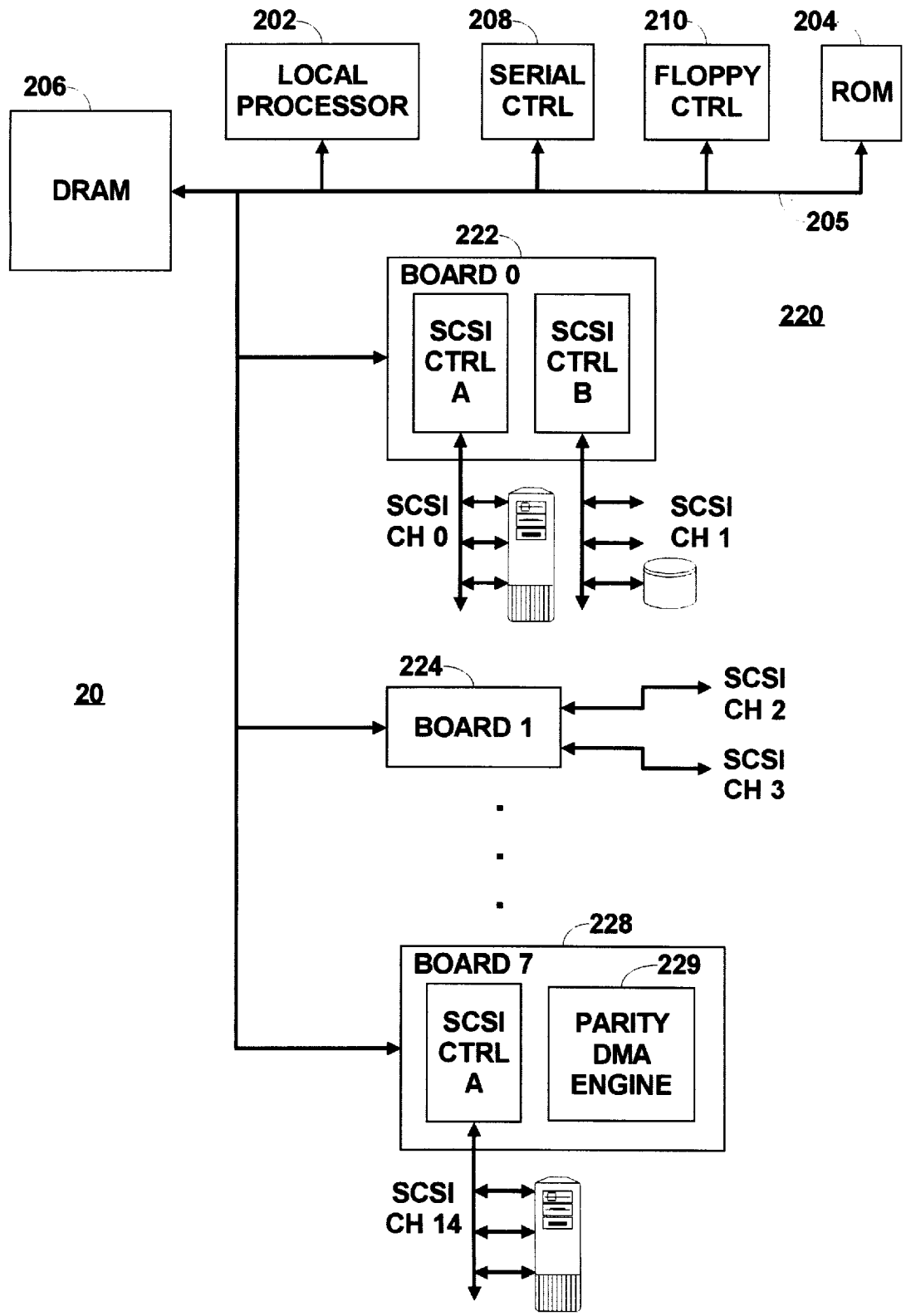
FIG. 2 is a more detailed block diagram of a disk drive controller in accordance with principles of the present invention.

FIG. 2 is a more detailed block diagram of a disk drive controller 20 in accordance with principles of the present invention. In FIG. 2, a local processor 202 provides the control of the other elements in the disk drive controller 20. Local processor may be a microprocessor of a known design, such as a Motorola MC88100 processor, and may further include known peripheral circuits for instruction and data caching, such as a pair of Motorola MC88200 cache IC chips. The local processor 202 is coupled to a read-only memory (ROM) 204, a read/write dynamic memory (DRAM) 206, an input/output port in the form of a serial channel controller 208, and a local mass storage device in the form of a floppy disk controller 210 via a system bus 205, which includes a data bus, an address bus and a control bus (not shown), in a known manner.

The system bus 205 is also coupled to a plurality 220 of SCSI input/output (I/O) boards. SCSI I/O board 0 222 includes a first SCSI bus controller SCSI CTRL A, and a second SCSI bus controller SCSI CTRL B. The first SCSI bus controller SCSI CTRL A is coupled to a first SCSI bus channel, SCSI CH 0, and the second SCSI bus controller SCSI CTRL B is coupled to a second SCSI bus channel, SCSI CH 1. In a known manner, each SCSI bus may be coupled to up to eight peripheral devices, of which the SCSI bus controller is one. It is also possible for the first and second SCSI bus controllers, SCSI CTRL A and SCSI CTRL B, respectively, to provide wide-SCSI busses, which support deep addressing, in which each SCSI bus channel may be coupled to up to 16 peripheral devices (including the SCSI bus controller).

The SCSI channels may be coupled either to one of the CPUs 10 (of FIG. 1), or to one or more disk drives 30, but not to both. For illustrative purposes, the first SCSI bus channel SCSI CH 0 is illustrated as being coupled to a CPU. To the CPU, the SCSI channel can appear to be up to seven peripheral devices. This is illustrated in 0 by coupling the CPU attached to SCSI channel 0 to all of the illustrated peripheral connections. Similarly, a peripheral device attached to the second SCSI bus channel SCSI CH 1 is illustrated as being a disk drive coupled to one of the peripheral connections.

A second SCSI I/O board, board 1 224, is also illustrated in FIG. 2. This board is identical to the first SCSI I/O board, BOARD 0, and also has two SCSI bus channels coupled to it, SCSI CH 2 and SCSI CH 3. These SCSI bus channels may also each be coupled to up to eight SCSI peripheral devices, including the SCSI bus controller. In an identical manner, third through seventh SCSI I/O boards (not shown) may be coupled between the system bus 205 and respective pairs of SCSI bus channels. An eighth SCSI I/O board 228 is similar to the first through seventh SCSI I/O boards, but includes only one SCSI bus controller, SCSI CTRL A, coupled to a single SCSI bus channel, SCSI CH 14. A parity DMA engine 229 takes the place of the second SCSI bus controller on BOARD 7. The first SCSI bus controller SCSI CTRL A on BOARD 7 operates identically to the SCSI bus controllers described above and is illustrated coupled to a CPU. The parity DMA engine 229 performs the error detecting code encoding and decoding function in a manner to be described in more detail below.

One skilled in the art will understand that it is not required that the SCSI I/O board containing the parity DMA engine 229 be the eighth SCSI I/O board, nor is it required that the parity DMA engine 229 take the place of the second SCSI bus controller on that SCSI I/O board. Instead, any of the SCSI I/O boards may include the parity DMA engine 229, and it may replace either the first or second SCSI bus controller on that SCSI I/O board.

In operation, the CPUs 10 (of FIG. 1) are coupled to the disk drive controller 20 via one of the SCSI bus channels, SCSI CH 0—SCSI CH 14. (See, for example, SCSI CH 0 and CH 14.) The disk drives 30 are also coupled to the disk drive controller 20 via the SCSI bus channels. (See, for example, SCSI CH 1.) When the disk drive controller 20 is first activated, the local processor 202 begins executing a power-on program stored in the ROM 204. This program may cause the local processor 202 to access a floppy disk previously placed in the floppy disk controller 210 to retrieve the program for controlling the operation of the disk drive controller 20. (The local processor 202 may also be placed in a maintenance mode in response to a request made by a field engineer via the serial controller 208. This maintenance mode allows the field engineer to diagnose problems in the disk drive controller 20 by making requests via a maintenance program stored in the ROM 204, and analyzing data returned by the local processor 202 in response to those requests, all via the serial controller 208.) The control program causes the local processor 202 to poll each SCSI bus channel to determine which SCSI bus channels are coupled to CPUs, and which are coupled to disk drives. The remainder of the disk drive controller 20 is then initialized to operate in the detected environment. When the local processor 202 has completely initialized the disk drive controller 20, it begins to monitor the CPUs 10 attached to its set of SCSI bus channels, looking for disk I/O requests, e.g. write or read requests.

For example, if one of the CPUs 10 (of FIG. 1) submits a write request, the SCSI bus controller attached to that CPU is conditioned by the local processor 202 to receive the write data from the CPU and store it in an assigned location in the disk drive controller DRAM 206. That SCSI bus controller transfers drive controller DRAM 206 by known means, such as direct memory access (DMA) techniques. The write data is then partitioned into data blocks of 512 bytes each. The local processor then sends appropriate commands to the parity DMA engine 229 to calculate a corresponding error detection code block in a manner appropriate to a RAID 5 disk drive subsystem, and to store the resulting error detection code block in a specified location in the disk drive controller DRAM 206, in a manner to be described below. When the parity DMA engine 229 has completed its assigned work, it notifies the local processor 202 by known means, e.g. an interrupt signal, that the error detection code block has been calculated. The local processor 202 then conditions the respective SCSI bus controllers coupled to the appropriate disk drives intended to contain these write data and error detection code blocks to transfer their respective data or error detection blocks from the disk drive controller DRAM 206 to their disk drives, again using known means, e.g. DMA techniques.

If one of the CPUs 10 (of FIG. 1) submits a read request, the SCSI bus controller attached to that CPU reports the read requests to the local processor 202. The local processor 202 then conditions the respective SCSI controllers coupled to the appropriate disk drives containing the requested data to retrieve the data blocks from the appropriate disk drives, and store them in respective locations in the disk drive controller DRAM 206. During this transfer, the internal electronics of the disk drives monitors the retrieval operation, in a known manner, to detect errors. If no errors are detected, then the SCSI bus controller coupled to the requesting CPU is conditioned by the local processor 202 to read the retrieved data blocks from the disk drive controller DRAM 206, and transfer that data to the requesting CPU using known means, e.g. DMA techniques.

However, if the internal electronics of the disk drives detects an error, or if a disk drive is out of service, then the SCSI bus controller coupled to the disk drive containing the error detecting code blocks corresponding to the retrieved data blocks is conditioned by the local processor 202 to retrieve those blocks and store them in a specified location in the disk drive controller DRAM 206. When the error detecting code blocks have been retrieved and stored in the RAM 206, the local processor 202 conditions the parity DMA engine 229 to check for errors by recalculating the error detection code blocks and comparing them to those retrieved from its disk drive. If detected errors have been successfully corrected, the SCSI bus controller coupled to the requesting CPU is conditioned by the local processor 202 to read the data blocks stored in the disk drive controller DRAM 206, and transfer the read data to the requesting CPU using known means, e.g. DMA techniques. If an uncorrectable error has occurred, then the requesting CPU is notified by the disk drive controller 20 and recovery operations are initiated in a known manner.

Figure 3:
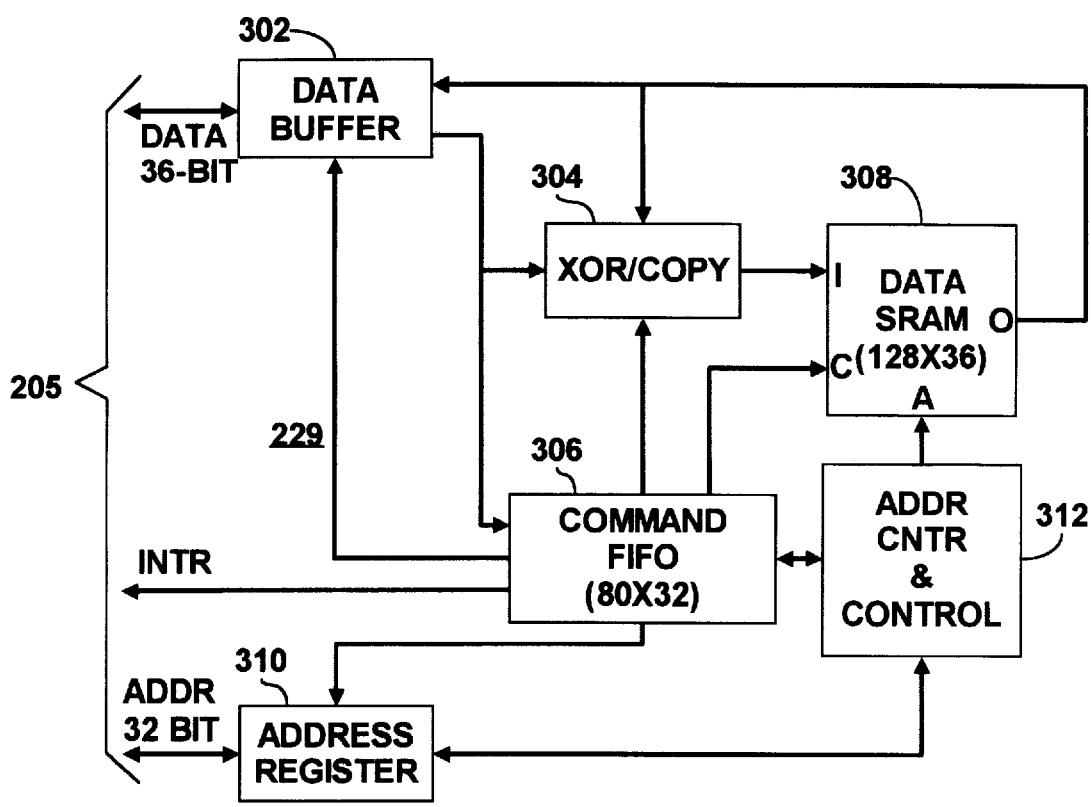
FIG. 3 is a more detailed block diagram of a parity DMA engine in accordance with principles of the present invention.

FIG. 3 is a more detailed block diagram of a parity DMA engine 229 in accordance with principles of the present invention. In FIG. 3, in order to simplify the figure, only those elements and signal lines necessary to understand the present invention and its operation are illustrated. Other known elements, such as I/O, interrupt, and DMA interface circuits, and other signal lines, such as control lines and clock signal lines, have been omitted. One skilled in the art of digital circuit design will understand what other elements are required, how to design and implement them and how to interconnect them to the illustrated elements; and which other signals are required, and how they are generated and supplied to the appropriate other elements in the parity DMA engine 229.

In FIG. 2, the system bus 205 is illustrated as including a 36-bit bi-directional data bus at the top left hand portion of the figure, a 32 bit bi-directional address bus at the bottom left hand portion of the figure, and an interrupt request line in the middle of the left hand portion of the figure. The data bus is coupled to a bi-directional terminal of a bi-directional data buffer 302. An output terminal of the bi-directional data buffer 302 is coupled to a first data input terminal of a exclusive-OR (XOR) or copy function circuit 304, whose operation will be described below; and to a data input terminal of a command first-in-first-out (FIFO) buffer 306. An output terminal of the XOR/copy function circuit 304 is coupled to a data input terminal I of a data buffer RAM 308. The data buffer RAM 308 is a 128 word by 36 bit static RAM (SRAM), which has the capacity to hold a single data or error detecting code block, which in the illustrated embodiment contains 512 words. One skilled in the art of computer system design will understand the advantages provided, in terms of faster access times, by such a static RAM. Each eight-bit byte in a data or error detecting code block has associated with it a parity bit, making a codeword of nine-bits. Four such codewords, making up 36 bits, are stored in parallel in each of the 128 storage locations in the data buffer SRAM 308, and in the disk drive controller DRAM 206 (of FIG. 2). A data output terminal O of the data buffer SRAM 308 is coupled to a second data input terminal of the XOR/copy function circuit 304 and an input terminal of the bi-directional data buffer 302.

The address bus is bi-directionally coupled to a first terminal of an address register 310. A second bi-directional terminal of the address register 310 is coupled to a corresponding terminal of an address counter and control circuit 312. An address output terminal of the address counter and control circuit 312 is coupled to an address input terminal A of the data buffer SRAM 308. A bi-directional terminal of the address counter and control circuit 312 is coupled to a corresponding terminal of the command FIFO 306. A first control output terminal of the command FIFO 306 is coupled to a control input terminal of the XOR/copy function circuit 304, a second control output terminal of the command FIFO 306 is coupled to a control input terminal C of the data buffer SRAM 308, a third control output terminal of the command FIFO 306 is coupled to a control input terminal of the bi-directional data buffer 302, a fourth control output terminal of the command FIFO 306 is coupled to a control input terminal of the address register 310, and a fifth control output terminal of the command FIFO 306 is coupled to the interrupt request line INTR in the system bus 205. The parity DMA engine 229 may, for example, be implemented in a Xilinx XC4010 field programmable gate array (FPGA) with on-chip SRAM.

In general operation, the parity DMA engine 229 calculates parity on respective blocks of data stored in the disk drive controller DRAM 206 (of FIG. 2) by executing operations specified by the local processor 202. One operation which may be performed by the parity DMA engine 229 is to load a data block from the disk drive controller DRAM 206 (of FIG. 2) into the data buffer SRAM 308. A second operation which may be performed is to XOR the block of data currently in the data buffer SRAM 308 with a block of data in the disk drive controller DRAM 206. A third operation which may be performed by the parity DMA engine 229 is to store the contents of the data buffer SRAM 308 back into the disk drive controller DRAM 206. A fourth operation which may be performed by the parity DMA engine 229 is to issue an interrupt to the local processor 202 (of FIG. 2). These operations will be described in more detail below.

By performing these operations in the proper order on data from the appropriate locations in the disk drive controller DRAM 206 (of FIG. 2), an error detection code block may be generated within the parity DMA engine 229 without requiring any processing by the local processor 202. It has been found that by using such a parity DMA engine instead of the local processor to generate the error detecting code block, an improvement in the throughput of from 25% to 55% can be expected.

When in its quiescent state, the parity DMA engine 229 operates in a known manner as an I/O device coupled to the system bus 205. The local processor 202 may send operation commands to the parity DMA engine 229 via an I/O operation. In this case, the address register 310 recognizes its own I/O address from the system address bus, and the data buffer 302 passes the data on the system data bus to the command FIFO 306. Successive commands may be sent from the local processor 202 to the parity DMA engine 229 and they are held in the command FIFO 306 to be executed in the order received, as previously sent commands are finished. These commands are for the operations described above.

Each command placed in the command FIFO 306 from the local processor 202 involving data transfer between the disk drive controller DRAM 206 and the data buffer SRAM 308 includes an address of a location in the disk drive controller DRAM 206 at which either the data is to be found or into which the data is to be transferred. When that command is executed, the parity DMA engine 229 operates in a known DMA mode. More specifically, the address specified in the command from the local processor 202 is passed from the command FIFO 306 to the address counter and control circuit 312 as the first disk drive controller DRAM 206 address. In the normal DMA mode of operation, when the parity DMA engine is given access to the system bus, the address of the first 36-bit word in the disk drive controller DRAM 206 is placed on the system bus via the address register 310. At the same time, the address of the first 36-bit location in the data buffer SRAM 308 is supplied to the address input terminal A of the data buffer RAM 308.

If the operation is a transfer of data from the disk drive controller DRAM 206 to the data buffer SRAM 308, then the command FIFO 306 conditions the disk drive controller DRAM 206 via the system bus 205 to read the addressed 36-bit data word and place it on the system data bus, and conditions the data buffer 302 to receive the data word from the system data bus and supply it to the XOR/copy circuit 304. Further processing by that circuit will be described below.

If the operation is a transfer of data from the data buffer SRAM 308 to the disk drive controller DRAM 206, then the command FIFO conditions the data buffer SRAM 308 to read the addressed 36-bit word and supply it to the data buffer 302, conditions the data buffer 302 to couple the output terminal of the data buffer SRAM 308 to the data bus, and conditions the disk drive controller DRAM 206 to write that word into the addressed location via the system bus 205. When the 36-bit transfer is complete, the addresses of both the location in the disk drive controller DRAM 206 and the location in the data buffer RAM 308 are incremented by one, and the next 36-bit word is transferred in the same manner. This continues until all 128 36-bit words have been transferred in that manner.

One skilled in the art of computer system design will understand that there is overhead time incurred with every DMA access, associated with requesting control of the system bus from the local processor, being granted control of the system bus by the local processor, and then returning control of the system bus to the local processor. This overhead time is in addition to the time required to access the data from the memory (in a memory read DMA access) and transfer the data over the system bus once control has been granted. In order to optimize DMA operations, burst transfers may be performed in which, once a requesting DMA device is granted access to the system bus, more than one memory word is transferred. In the illustrated embodiment, when a DMA transfer is performed between the disk drive controller DRAM 206 and the data buffer SRAM 308 in the parity DMA engine 229, a burst of four 36-bit words (sixteen parity encoded bytes) is transferred during each DMA access. In this case, the overhead involved in the DMA request is incurred only once for every four words, instead of for every word.

One skilled in the art of computer system design will also understand that DRAMs may be designed to operate in a page mode in which access times for subsequent sequentially addressed locations is less than the access time for the first location. In the illustrated embodiment, the disk drive controller DRAM 206 is operated during DMA accesses in a page mode. In addition, for DMA transfers from a peripheral device to a DRAM, fast buffer memory is provided in the DRAM, in a known manner, to permit transfer of data from the peripheral device to the fast buffer memory in the DRAM on the next system bus cycle following the granting of the system bus to the peripheral device. The data in the fast buffer memory is then stored in the DRAM while the system bus is released for other operations.

If the specified operation is a straight transfer of a block of data from the disk drive controller DRAM 206 to the data buffer SRAM 308, then the command FIFO 306 conditions the XOR/copy circuit 304 to pass the data from the data buffer 302 directly to the data input terminal I of the data buffer SRAM 308. The command FIFO 306 then conditions the data buffer SRAM 308 to store the data at the address specified by the address counter and control circuit 312. If the specified operation is to XOR a block of data from the disk drive controller DRAM 206 with the block of data in the data buffer SRAM 308, then the command FIFO 306 conditions the data buffer SRAM 308 to first read the 36-bit data word from the location specified by the address counter and control circuit 312. That data word is supplied to one input terminal of the XOR/copy circuit 304. Simultaneously, the 36-bit data word from the disk drive controller DRAM 206 is supplied to the other input terminal of the XOR/copy circuit 304 from the data buffer 302. Then the XOR/copy circuit 304 is conditioned by the command FIFO 306 to form the bit-by-bit XOR of the 36-bit word from the data buffer 302 with the 36-bit word from the data buffer SRAM 308. The result of that XOR operation is then stored in the location in the data buffer SRAM 308 specified by the address counter and control circuit 312.

Finally, if the specified operation is to interrupt the local processor 202, then the command FIFO 306 activates the interrupt request INTR signal line in a known manner. The local processor 202, also in a known manner, will respond to the interrupt.

In known RAID 5 implementations, different numbers of disk drives may be used to reliably store data. For example, in one known implementation, three disk drives may be used in which two data blocks are stored on two of the disk drives while an error detecting code block, calculated by an XOR operation on the two data blocks, is stored on the third. In another known implementation, five disk drives are used in which four data blocks are stored on four of the disk drives, while an error detecting code block, calculated by three XOR operations on the four respective data blocks, is stored on the fifth. The operation of the disk drive controller 20 in calculating the error detecting block for this implementation is described in more detail below. In another known alternative implementation, nine disk drives may be used in which eight data blocks are stored on eight of the disk drives, while an error detecting code block, calculated by seven XOR operations on the eight respective data blocks, is stored on the ninth.

Referring now to a five disk drive RAID 5 implementation, for a disk write operation, if four data blocks stored at locations A, B, C and D in the disk drive controller DRAM 206 are to be XOR'd to form an error detection code block, which is then to be placed at location E in the disk drive controller DRAM 206, then the following commands would be supplied to the command FIFO 306 of the parity DMA engine 229 by the local processor 202: (1) Transfer the block at location A in the disk drive controller DRAM 206 to the parity DMA engine 229; (2) XOR the block at location B in the disk drive controller DRAM 206 with the block in the parity DMA engine 229; (3) XOR the block at location C in the disk drive controller DRAM 206 with the block in the parity DMA engine 229; (4) XOR the block at location D in the disk drive controller DRAM 206 with the block in the parity DMA engine 229; (5) Transfer the block in the parity DMA engine 229 to location E in the disk drive controller DRAM 206; (6) Send an interrupt to the local processor 202 to indicate that the error detection code block has been calculated.

For a disk read operation in which an error is detected by the internal circuitry of a disk drive, or in which a disk drive is out of service, if three successfully read data blocks at locations A, B, and C in the disk drive controller DRAM 206 and a previously read error detection code block at location E are used to correctly reconstruct the data block at location D, then the following commands would be supplied to the command FIFO 306 of the parity DMA engine 229 by the local processor 202: (1) Transfer the block at location A of the disk drive controller DRAM 206 to the parity DMA engine 229; (2) XOR the block at location B of the disk drive controller DRAM 206 with the block in the parity DMA engine 229; (3) XOR the block at location C of the disk drive controller DRAM 206 with the block in the parity DMA engine 229; (4) XOR the block at location D of the disk drive controller DRAM 206 with the block in the parity DMA engine 229;(5) Transfer the block in the parity DMA engine 229 to location E in the disk drive controller DRAM 206; (6) Send an interrupt to the local processor 202 to indicate that the erroneous or missing block has been reconstructed. The local processor can then proceed as normal to return the four data block at location blocks A, B, C, and D to the requesting CPU.

A disk drive system according to the present invention allows RAID 5 error detection code blocks to be calculated with only the minimum of intervention by the local processor 202. That is, the only participation of the local processor 202 is to supply the operational commands to the command FIFO 306 of the parity DMA engine 229. In addition, data is transferred between the disk drive controller DRAM 206 and the parity DMA engine 229 via DMA in bursts of four 36-bit wide parity encoded words, to minimize DMA overhead time. The required XOR operation is calculated successively on each of four 36-bit wide words. In addition, the access time of the disk drive controller DRAM 206 is minimized by operating it in a page mode during DMA transfers and providing fast buffer memory in the disk drive controller DRAM 206 for memory write operations. The use of fast SRAM in the parity DMA engine 229 further optimizes the speed of calculating the required XOR operations. Finally, only a single DMA transfer cycle is required for each word in a block during an XOR operation generating the error detecting code block. This means that fewer bus cycles are needed to perform the error correcting code block calculation than in systems operating on a byte-by-byte basis.

What is claimed is:

1. In a disk drive controller including a memory for storing a plurality of blocks each having a predetermined size, and a parity engine for calculating an error detecting code block, the party engine comprising:

a data buffer RAM, having an input terminal and an output terminal, for storing a block having the predetermined size;

a function circuit, having a first input terminal coupled to the disk drive controller memory, a second input terminal coupled to the output terminal of the data buffer RAM, and an output terminal coupled to the input terminal of the data buffer RAM; and a command circuit, for conditioning the function circuit and the data buffer RAM to operate in a first operating mode to retrieve a block from the disk drive controller memory and store it in the data buffer RAM, and in a second operating mode to calculate the exclusive-OR (XOR) of a block from the disk drive controller memory with a block from the data buffer RAM and store it in the data buffer RAM.

2. The engine of claim 1 further comprising a system bus coupling the disk drive controller memory and the parity engine; wherein:

the parity engine further comprises DMA control circuitry coupled to the system bus; and the command circuit conditions the DMA control circuitry in the first and second operating mode to transfer blocks from the disk drive controller memory to first input terminal of the function circuit via DMA over the system bus.

3. The engine of claim 2 wherein the DMA control circuitry comprises:

a bi-directional data buffer, coupled between the system bus and the function circuit; and an address counter and control circuit, coupled between the command circuit and the system bus.

4. The engine of claim 1 wherein:

the disk drive controller further comprises a local processor, coupled to the memory and the parity engine via a system bus, for sending commands to the command circuit via I/O operations over the system bus; and the command circuit contains circuitry for receiving the commands from the local processor, and selectively conditions the function circuit and the data buffer RAM to operate in the first and second operating modes in response to the received commands.

5. The engine of claim 4 wherein the command circuit contains a command FIFO for holding commands received from the local processor for processing in order as previously received commands are completed.

6. The engine of claim 4 wherein the command circuit operates in a further mode to send an interrupt request signal to the local processor over the system bus in response to processing of an interrupt command from the command circuit.

7. The engine of claim 1 wherein the command circuit further conditions the function circuit and the data buffer RAM to operate in a third operating mode to retrieve data from the data buffer RAM and store it in a block in the disk drive controller memory.

8. The engine of claim 7 further comprising a system bus coupling the disk drive controller memory and the parity engine, wherein:

the parity engine further comprises DMA control circuitry coupled to the system bus; and the command circuit conditions the DMA control circuitry in the first and second operating mode to transfer blocks from the disk drive controller memory to first input terminal of the function circuit via DMA over the system bus, and conditions the DMA control circuitry in the third operating mode to transfer a block from the data buffer RAM to a block in the disk drive memory via DMA over the system bus.

9. The engine of claim 7 wherein:

the disk drive controller further comprises a local processor, coupled to the memory and the parity engine via a system bus, for sending commands to the command circuit via I/O operations over the system bus;

the command circuit contains circuitry for receiving the commands from the local processor, and selectively conditions the function circuit and the data buffer RAM to operate in the first, second and third operating modes in response to the received commands.

10. In a disk drive controller, including: a local processor; a RAM partitioned into a plurality of blocks each having a predetermined size and capable of containing one of data and an error detecting code; and a parity DMA engine containing a data buffer RAM capable of containing one block having the predetermined size; all coupled together by a system bus; a method for generating an error detecting code block comprising the steps of:

sending a sequence of commands from the local processor to the parity DMA engine over the system bus via respective I/O operations, the sequence of commands conditioning the parity DMA engine to perform the following steps:

transferring the contents of a first one of the plurality of blocks containing data from the disk drive controller RAM to the data buffer RAM over the system bus via DMA;

retrieving the contents of a second one of the plurality of blocks containing data from the disk drive controller RAM over the system bus via DMA;

calculating the exclusive-OR of the retrieved contents of the second one of the plurality of blocks with the contents of the data buffer RAM, and storing the result in the data buffer RAM;

transferring the contents of the data buffer RAM to a third one of the plurality of blocks in the disk drive controller RAM over the system bus via DMA; and notifying the local processor via an interrupt request signal over the system bus.

11. The method of claim 10 further comprising the step of repeating the retrieving and calculating steps a plurality of time for respective blocks containing data from the disk drive controller RAM before performing the step of transferring the contents of the data buffer RAM to the disk drive controller RAM.

12. The method of claim 10 further comprising, before the step of transferring the contents of the data buffer RAM to the disk drive controller RAM, the steps of:

retrieving the contents of one of the plurality of blocks containing an error detecting code from the disk drive controller RAM to the parity DMA engine over the system bus via DMA; and calculating the exclusive-OR of the retrieved contents of the one of the plurality of blocks containing an error detecting code with the contents of the data buffer RAM, and storing the result in the data buffer RAM.

13. A disk drive controller, comprising:

a system bus, having an data bus portion, an address bus portion, and a control bus portion including an interrupt request line;

a local processor, coupled to the system bus;

a RAM, coupled to the system bus, and partitioned into a plurality of blocks each having a predetermined size and capable of containing one of data and an error detecting code; and a parity DMA engine, coupled to the system bus, and comprising:

a bi-directional data buffer, coupled to the data bus portion of the system bus, and having an input and an output terminal, the input terminal for selectively receiving data from the parity DMA engine to be placed on the data portion of the system bus in response to a data buffer control signal, and the output terminal for selectively receiving data from the data bus portion of the system bus for the parity DMA engine in response to the data buffer control signal;

a command FIFO, having an input terminal coupled to the output terminal of the bi-directional data buffer and a plurality of control signal output terminals, including a data buffer control signal output terminal, for receiving commands for the parity DMA engine from the local processor over the system bus via I/O transfer, and producing respective control signals in response to the received command;

a data buffer RAM, having a data input terminal, a data output terminal, an address input terminal and a control input terminal coupled to a corresponding control signal output terminal of the command FIFO, and being capable of holding one block having the predetermined size; and a function circuit, having a first input terminal coupled to the output terminal of the bi-directional data buffer, a second input terminal coupled to the data output terminal of the data buffer RAM, an output terminal coupled to the data input terminal of the data buffer RAM, and a control signal input terminal coupled to a corresponding control signal output terminal of the command FIFO, for selectively coupling the output terminal of the bi-directional data buffer to the data input terminal of the data buffer RAM, or calculating the exclusive-OR of data from the bi-directional data buffer with the data from the data buffer RAM and supplying the result to the data input terminal of the data buffer RAM, in response to a control input signal from the command FIFO; and an address counter and control circuit, having a bi-directional terminal coupled to the address portion of the system bus and an output terminal coupled to the address input terminal of the data buffer RAM; wherein:

the command FIFO conditions the function circuit, the bi-directional data buffer, the data buffer RAM, and the address counter and control circuit to operate in a first operating mode to transfer a first one of the plurality of blocks from the disk drive controller RAM to the data buffer RAM via DMA over the system bus; to repeatedly operate in a second operating mode to retrieve respective ones of the plurality of blocks from the disk drive controller RAM via DMA over the system bus, and calculate the exclusive-OR of the retrieved block with the block from the data buffer RAM and store the result in the data buffer RAM; and to operate in a third operating mode to transfer the block in the data buffer RAM to the disk drive controller RAM via DMA over the system bus; and then generates an interrupt request signal on the control portion of the system bus for the local processor.

* * * * *